Patented June 25, 1940

2,205,410

UNITED STATES PATENT OFFICE 2,205,410

PROCESS FOR TREATING HYDROCARBON OILS

Roscoe D. Howard, Tulsa, Okla., assignor, by mesne assignments, to Petroleum Research Corporation, Chicago, Ill., a corporation of Delaware No Drawing. Application March 25, 1936, Serial No. 70,800

10 Claims. (Cl. 196—28)

This invention relates generally to the treatment or refining of petroleum hydrocarbon oils, and is particularly applicable to the treatment of raw cracked hydrocarbon distillates produced by the high temperature conversion of high boiling hydrocarbons into lower boiling hydrocarbons suitable for motor fuel of the gasoline type.

A general object of the invention is to provide an improved process for purifying and improving such hydrocarbon oils or distillates in order to produce more desirable commercial forms of gasoline or the like. A more specific object of the invention is to provide an improved method of refining such cracked distillates whereby to remove therefrom certain undesirable types of gums and gum-forming constituents, certain types of sulphur-containing hydrocarbons (e. g. mercaptans or the like), certain types of highly colored hydrocarbons, and certain types of hydrocarbons imparting undesirable odors to the oil or distillate.

In general, the process of the present invention involves a chlorination refining treatment of the petroleum products to be purified or improved, a type of treatment heretofore proposed, broadly, as in the patent to Teplitz No. 1,801,213. The present invention is an improvement on such prior proposed methods in important respects, including provision for continuous operation and other advantages, as will appear more fully hereinafter.

In carrying out my improved process I introduce chlorine, preferably in gaseous form, into the vapor stream of the cracked gasoline distillate as it is being treated or produced, most desirably at the normal mean boiling temperature of said distillate, a certain definite period being allowed for adequate reaction between the chlorine gas and the cracked oil vapors. The chlorinated vapors are then led into a chamber or receptacle where they are systematically exposed to intimate contact with suitable dechlorinating material, such as a suitable metal or metallic surface, e. g. a zinc surface, as by being caused to pass upwardly through a mass or body of such material; after which the vapors are led to a condenser. The gasoline condensate is then given a water wash or a very dilute sodium hydroxide wash, if found necessary or desirable, to remove any traces of resultant acid reaction and to complete the purification of the gasoline.

In one desirable practical form of my improved process embodying the underlying principles of the invention, and illustrating the same by way of typical specific example, the raw cracked gasoline distillate (e. g. a 390° end-point cracked gasoline) is continuously introduced into a still where complete vaporization occurs. The raw material is charged into the still at a predetermined rate which may be maintained constant throughout the period of operation. The hot vapors, at temperatures of, say, from 340° F. to 350° F., pass upward into a well insulated reflux column and thence into a smaller vapor tube wherein their velocity is increased at the rate of from 3 to 6 feet per second. Through a small bore or capillary tube positioned centrally within the vapor tube, chlorine gas is introduced into the stream of vaporized gasoline distillate at a predetermined rate. In a typical instance the rate is such as to effect introduction of chlorine in the ratio of one-fourth pound of chlorine to each barrel (42 gallons) of cracked gasoline distillate. In order to insure as thorough distribution or mixing of the chlorine gas with the vapors of raw material as is possible, an inactive diluent gas is mixed with the chlorine gas, prior to its introduction into the vapor stream, in such proportion that the concentration of the chlorine in the mixture is approximately one volume of chlorine to fifty of diluent gas. Steam or air may be used as a substitute for said inactive gas.

The chlorinated vapors pass into a larger chamber where their velocity is greatly reduced, thereby allowing sufficient time (e. g. on the order of a few seconds) for interaction between the vapors of the raw material and the chlorine, and the settling out of certain tarry matters which result from the chlorine treatment. The chlorinated vapors then pass into the bottom of a large tower or chamber containing a permeable mass of suitable dechlorinating material, more particularly zinc or a zinc-containing material, through which the vapors flow upwardly, their velocity of flow being at the same time reduced to, say, within the range of approximately 0.02 to 0.03 linear feet per second. This velocity may be varied in accordance with the raw material treated or other conditions but sufficient time should be allowed in any event to effect substantially complete dechlorination. Under such circumstances, passage of the chlorinated vapors through the mass of dechlorinating material removes from the chlorinated vapors virtually all the chlorine, not only that which may be free but also that which has entered into combination with certain of the hydrocarbons of the gasoline distillate.

The vapors which have been thus treated and dechlorinated next pass into a condenser where they are condensed. The condensate may be washed with water or with a dilute sodium hydroxide solution, a 0.3 normal sodium hydroxide solution being very effective for this purpose.

As a result of such method of treatment and purification the raw cracked gasoline distillate is not only rendered sweet to doctor solution and of better color (e. g. 30 plus), but in addition its gum content, as determined by the copper dish test, is largely eliminated, being reduced by more than 98 per cent in a typical instance. At the same time, stability of the finished gasoline toward gum formation during storage periods is materially increased. With reference to stability of the treated gasoline, the "breakdown period" as indicated by an accelerated oxidation bomb test is extended in a typical instance to over four hours. Substantial reduction of sulphur content is also attained. In other words, a substantially finished gasoline of pleasant odor is produced, which has a copper dish gum content of only four or five milligrams per 100 c. c., a color of 30 plus, and a materially reduced sulphur content; such gasoline giving a negative reaction with doctor solution and a negative copper strip corrosion test, and being quite stable toward oxidation or aging and the action of direct sunlight.

It is further to be observed that the method of vaporizing the raw material or material to be treated may be varied at will and in accordance with good refinery practices, this being subject to specific conditions arising in each individual plant or refinery. In some plants the treating unit may be interposed in the system at a point where the cracked gasoline is in a vapor state. In others it is more practical to connect the treating unit for carrying out my improved method at the point where the cracked gasolines leave the stabilization unit. In this case the heat energy already contained in the cracked gasoline is employed for vaporization instead of being transferred to some cooling medium such as water. In the first case the problem of either rerunning or doctor treating, or both, is dispensed with. In the second case only an additional small amount of heat is needed to complete the vaporization preparatory to applying the process of the invention.

The introduction of the gaseous chlorine into the hot cracked vapors should be accomplished in such manner that thorough and efficient distribution or mixing is obtained between the chlorine and the cracked hydrocarbons. Dilution of the chlorine by means of an inert or comparatively unreactive gas is important and ordinarily essential to attainment of best results, because the concentration of chlorine per unit volume is greatly decreased, thereby allowing more even distribution of the chlorine throughout the cracked gasoline vapors and assuring a more uniform, complete and efficient treatment. However, I do not wish to be limited to the use of such diluent gas, because in some cases the pure undiluted chlorine gas may be used to advantage in treating the hot hydrocarbon vapors. Thorough intermingling of the treating gas is assured by the high velocity flow through the vapor lines. Subsequent discharge of the chlorinated vapors into a drum or contact chamber of relatively large volume decreases their velocity of flow sufficiently to allow impurities or tarry matters, as above mentioned, resulting from the reaction of the chlorine upon the unsaturated hydrocarbons, to settle out. The low concentration of the chlorine with respect to the volume of vapor being treated prevents over-treating or the destruction of valuable hydrocarbons. As the chlorinated vapors pass into the zinc tower, an upward flow is desired in that there is obtained some washing and cleaning of the zinc material as the heavy polymer fractions drain back as reflux. Also, some condensation and refluxing of the purified gasoline is obtained in the zinc column or chamber, this action appearing to have some beneficial effect, in that certain high boiling fractions are fractionated out and prevented from carrying over into the finished gasoline stream.

Since it has been found that good results are obtained over a fairly wide range of chlorinating temperatures, the invention is not limited to the application of chlorine gas to hot cracked hydrocarbon vapors but is to be understood as applicable throughout such temperature range as may be desirable or suitable for attaining satisfactory results, having due regard to the fact that different grades of cracked gasoline vary in their characteristics and properties, including their average or mean boiling temperatures. However, best results will usually be obtained when the oil vapor into which the chlorine gas is introduced is substantially dye.

Any suitable material for dechlorinating may be used such as zinc, zinc oxide, zinc spelter, or finely divided zinc dust. If zinc spelter is used it is advisable to employ it in such form or condition as to obtain as large a surface area as possible with respect to unit weight. I have also found zinc dust to be very satisfactory due to its finely divided nature. Most desirably, the zinc dust is employed in mixture with a binder such as plaster of Paris in order that the zinc particles may be firmly held in a rock-like structure or mass. A mixture of 50% by weight of zinc dust and 50% by weight of plaster of Paris has been found to give a very firm rock-like structure when thoroughly mixed with a suitable quantity of water and allowed to set or dry. This mass is ordinarily broken up into particles or pieces about the size of a small pea and used in this form. Other types of binder or carrier may also be used such as fuller's earth, certain types of cement, clays, etc. When and after a zinc-containing material or mixture of this type ceases to function efficiently, it may be revived by burning in a retort at a temperature sufficiently low to keep from igniting or subliming the zinc content. By employing either zinc dust or zinc oxide retained in a matrix or body of porous rock-like material of the character described, the dechlorinating and refining effect is materially increased over that obtainable by the use of metallic zinc in plates of larger particles, due in part to the fact that the surface area or contact surface is greatly increased per unit weight of dechlorinating agent employed. Because of the firm and rock-like structure of the material carrying either the zinc dust or the zinc oxide, said material can be handled easily and with only slight loss, and the tarry residues which accumulate on the surface as a result of the interaction of the zinc with the chlorine treated vapors are readily burned off in the revivifying treatment. Another type of zinc-oxide-bearing material suitable as a dechlorinating agent in practicing the process is an oxidized ore of zinc.

By having the raw cracked gasoline or other oil in vapor phase when subjecting it to the action of chlorine, there is attained more uniform distribution of the chlorine throughout, and intermingling thereof with, the vapors of the cracked gasoline undergoing treatment. In converting the cracked gasoline from liquid into gaseous or vapor phase, its volume is increased approximately 224 times at atmospheric pressure. When this large volume of vapor is confined and caused to flow through a small passage, its velocity of flow past a given point is comparatively high, as stated hereinabove. By introducing the treating gas (e. g. chlorine) at such a point in the correct small amount or proportion, attainment of the desired very uniform distribution and intermingling is made certain. Such uniformity of chlorine distribution, especially when the chlorine is diluted with air or the like before being introduced into the cracked gasoline vapors, results in low chlorine concentration throughout the gaseous mixture. This is a very important factor because it provides an effective safeguard against such localized over-treating or over-chlorinating of some portions of the gasoline vapors as would be destructive of valuable hydrocarbons undesirable to attack, while at the same time ensuring more complete and effective chlorinating action upon those hydrocarbons that are unstable or otherwise objectionable and hence intended to be attacked. At the moderately elevated temperature most desirably characterizing the present process, the action of the chlorinating agent is rather rapid and formation of a small amount of tarry matter results. Chlorinated hydrocarbon products initially formed are for the most part apparently immediately decomposed with evolution of hydrogen chloride, and any not entirely decomposed are later dechlorinated when they contact the mass of zinciferous material or other dechlorinating substance in the dechlorinating column or chamber. The more uniform distribution of the chlorine into the raw cracked gasoline accomplished by taking care that the gasoline is in vapor or gaseous phase when the chlorine is introduced thereinto, and the consequently increased effectiveness of the desired chemical reaction of the chlorine upon the content of unstable and other hydrocarbons readily susceptible to attack by chlorine, enable the production by the present process of sweet gasoline as indicated by its giving a negative test with sodium plumbite or "doctor" solution.

From the foregoing description it will be readily apparent that the invention provides a method of treating or purifying hydrocarbon oils, especially cracked gasoline, in a continuous manner as distinguished from previous methods in which the material is treated in batches or intermittently, the improved method being thus particularly well adapted for commercial purposes because it can the more readily be coordinated with the manufacture or distillation of such oils. Furthermore more uniform results than were attainable heretofore are attained at comparatively low cost. Actual application of the new process to the treatment of cracked hydrocarbon distillate or oil having various impurities or ingredients rendering it yellowish in color and disagreeable in odor, has demonstrated its effectiveness to produce colorless gasoline or oil of comparatively pleasant odor and of a type which is highly desirable for commercial purposes. Moreover, it renders feasible substantial completion, in one operation, of the purifying or refining of the raw distillate, such as cracked gasoline, thus avoiding the necessity of further separating or stabilizing treatments.

Although, in explaining the underlying principles of the invention, a specific practical embodiment thereof has been hereinabove described in detail by way of illustrative example, it is to be understood that the invention is not limited to the particular details set forth. Thus, some other chlorinating agent (e. g. hydrogen chloride
gas) containing or capable of yielding available chlorine, may in some cases be introduced into the mineral oil vapors to be treated, in place of chlorine gas. This and other departures from the detailed procedure described are contemplated in the practice of this invention and are to be regarded as within the scope of the appended claims.

What is claimed is:
1. The process of refining crude mineral oil distillates that are relatively low-boiling and are contaminated with mercaptan sulphur compounds, which comprises mixing hot vapors of such a distillate with a small portion of a chlorinating agent prediluted with an oxygen-containing gas compatible therewith, contacting the resultant mixture with dechlorinating material containing zinc in oxidized form to dechlorinate and sweeten the vapors, and condensing a refined relatively low-boiling mineral oil distillate from the residual vapors.

2. The process of refining crude cracked mineral oil distillates of the gasoline type which comprises establishing a flowing stream of hot vapors of such a distillate, introducing thereinto at a controlled rate a small proportion of a gaseous chlorinating agent, permitting said chlorinating agent to act for a sufficient time to effect the desired chlorination of hydrocarbons present in the mixture, then contacting the gaseous mixture with zinciferous dechlorinating material, and condensing from the mixture a refined mineral oil distillate.

3. The process of refining crude cracked mineral oil distillates of the gasoline type which comprises establishing a flowing stream of hot vapors of such a distillate, introducing thereinto at a controlled rate a small proportion of a gaseous chlorinating agent diluted with an oxygen-containing gas, permitting said chlorinating agent to act for a sufficient time to effect the desired chlorination of hydrocarbons present in the mixture, then contacting the gaseous mixture with zinciferous dechlorinating material, and condensing from the mixture a refined mineral oil distillate.

4. The process of refining crude cracked mineral oil distillates of the gasoline type which comprises establishing a stream of hot vapors of such a distillate flowing at relatively high velocity, introducing thereinto chlorine gas in predetermined small proportion and an oxygen-containing gas compatible therewith, substantially reducing the flow velocity of the resultant mixture for a predetermined period of time, then passing the mixture through a permeable mass of dechlorinating material containing zinc in oxidized form, and condensing from the mixture a refined mineral oil distillate.

5. The process of refining crude cracked mineral oil distillates of the gasoline type which comprises establishing a stream of hot vapors of such a distillate flowing at relatively high velocity, introducing thereinto chlorine gas in predetermined small proportion and an oxygen-containing gas compatible therewith, substantially reducing the flow velocity of the resultant mixture through a permeable mass of rock-like dechlorinating material comprising finely divided zinc at least partly in oxidized form and an associated strong, resistant bonding agent, and condensing from the mixture a refined mineral oil distillate.

6. The process of refining crude gasoline containing unsaturates which comprises introducing a mixture of chlorine and air into hot vapors of such gasoline to chlorinate the unsaturates, contacting the chlorinated vapor mixture with material containing zinc oxide, and then condensing from the vapors a refined gasoline.

7. In the art of refining crude cracked mineral oil distillates of the gasoline type containing gum-forming and color-producing constituents as well as deleterious sulphur compounds, the process which comprises commingling hot vapors of such crude gasoline distillate with a small proportion of chlorine prediluted with a very much larger proportion of air, allowing sufficient time to elapse for moderate chlorinating action to occur, then passing the mixture through a permeable mass of solid zinciferous contact material having a dechlorinating action, drain from said mass separated heavy liquid products, leading the residual substantially dechlorinated vapor mixture from said mass, and condensing from said mixture a doctor-sweet gasoline of good color, stability and odor.

8. The process defined in claim 7, wherein said mass of contact material consists in large part of zinc in at least partly oxidized condition.

9. The process defined in claim 7, wherein said mass of contact material consists in large part of zinc in at least partly oxidized condition and in mixture with a set cementitious binder to form a hard, resistance composition 10. The process defined in claim 7, wherein said mass of contact material comprises hard, resistant pieces of a set mixture of plaster of Paris and finely divided zinc in oxidized condition.

ROSCOE D. HOWARD.